(12) United States Patent
Barbezat

(10) Patent No.: US 7,357,068 B2
(45) Date of Patent: Apr. 15, 2008

(54) MATERIAL AND PROCESS FOR THERMAL COATING, SURFACE LAYER AND ALSO COMPRESSOR WITH A SURFACE LAYER OF THE MATERIAL

(75) Inventor: Gérard Barbezat, Opfikon (CH)

(73) Assignee: Sulzer Metco AG, Wohlen (CH)

( * ) Notice: Subject to any disclaimer, the term of this patent is extended or adjusted under 35 U.S.C. 154(b) by 0 days.

(21) Appl. No.: 11/326,927

(22) Filed: Jan. 6, 2006

(65) Prior Publication Data
US 2006/0254418 A1   Nov. 16, 2006

(30) Foreign Application Priority Data
Apr. 7, 2005 (EP) .................................. 05405283

(51) Int. Cl.
*C23C 4/10* (2006.01)
*B32B 9/00* (2006.01)

(52) U.S. Cl. .................. 92/170.1; 427/453; 428/472

(58) Field of Classification Search .............. 90/170.1; 427/453; 428/469, 472, 702
See application file for complete search history.

(56) References Cited

U.S. PATENT DOCUMENTS

| | | | |
|---|---|---|---|
| 3,864,093 A * | 2/1975 | Wolfla ........................ | 428/564 |
| 3,925,575 A * | 12/1975 | Church et al. .............. | 427/226 |
| 4,055,705 A * | 10/1977 | Stecura et al. .............. | 428/633 |
| 4,478,987 A * | 10/1984 | Fanelli et al. ............... | 526/97 |
| 4,492,766 A | 1/1985 | Zverina et al. | |
| 4,495,907 A * | 1/1985 | Kamo ...................... | 123/193.2 |
| 4,992,396 A | 2/1991 | McGarry et al. | |
| 6,238,807 B1 * | 5/2001 | Yasuda et al. .............. | 428/627 |
| 6,452,957 B1 | 9/2002 | Burger et al. | |
| 6,884,460 B2 * | 4/2005 | Ackerman et al. .......... | 427/229 |
| 6,958,303 B2 * | 10/2005 | Zhang et al. ........... | 252/520.21 |
| 2004/0142812 A1 | 7/2004 | Buchberger et al. | |

FOREIGN PATENT DOCUMENTS

| | | |
|---|---|---|
| DE | 3012515 A | 5/1989 |
| JP | 64000258 | 1/1989 |
| JP | 94104888 B2 * | 12/1994 |
| JP | 11286768 | 10/1999 |
| KR | 97001253 B1 | 2/1997 |

OTHER PUBLICATIONS

Chemical Abstracts + Indexes; Bd. 22; Nr. 114; Jun. 3, 1991; American Chemical Society; Columbus, US.
Web Page; "Diamocor Line of High-Purity Alumina Powders;" at URL:http://www.sawyerresearch.com/prod41.htm; printed Sep. 23, 2005.

* cited by examiner

*Primary Examiner*—Thomas E. Lazo
(74) *Attorney, Agent, or Firm*—Townsend and Townsend and Crew, LLP

(57) ABSTRACT

The invention relates to a material based on an oxide ceramic for the manufacture of a surface layer (5) by means of a thermal coating process including aluminum oxide and zirconium oxide, with the material additionally containing chromium oxide for the simultaneous optimization of the hardness and toughness of the surface layer (5).

17 Claims, 1 Drawing Sheet

MATERIAL AND PROCESS FOR THERMAL COATING, SURFACE LAYER AND ALSO COMPRESSOR WITH A SURFACE LAYER OF THE MATERIAL

BACKGROUND OF THE INVENTION

The invention relates to a material and to a process for thermal coating, to a surface layer of the material and also to a compressor with such a surface layer.

Ceramic coatings applied by thermal spraying have been known for a long time for a multitude of applications. Thus, by way of example, surfaces of oil lubricated cylinder running surfaces in vehicle engines have already been coated for some time by plasma spraying amongst other things, with the layer significantly reducing above all the coefficient of friction which is effective between the piston rings and the cylinder wall whereby the wear of the piston rings and the cylinder is significantly reduced, which leads to an increase of the working life of the engine, to a prolongation of the service intervals, for example between oil changes, and not least to a notable increase in the performance of the engine. This is achieved by different measures. For example such layers can contain deposits of dry lubricants in a base matrix for oil lubricated combustion engines, with it also being possible to provide pores of a predeterminable size in the base matrix which function as oil pockets and thus, together with the relatively soft embedded dry lubricants, significantly reduce the friction between the piston rings and the cylinder wall. The base matrix itself, which contains the dry lubricants and the pores amongst other elements, is built up of a hard matrix material which guarantees a long working life of the cylinder running surface and of the piston rings. A modern high performance cylinder running surface of this kind is for example described in detail in EP 1 340 834.

Further typical applications for surfaces applied by thermal spraying are the coating of turbine parts with wear protection layers and heat insulating layers, and the coating of components of oil lubricated bearings, such as for example the coating of crankshaft bearings or other workpieces exposed to special physical, chemical or thermal loadings. Depending on the purpose which the layer has to satisfy, quite specific materials are used, as a rule in the form of spray powders or spray wires which have the necessary specific characteristics and composition in order to generate the required characteristics of the surface layer to be sprayed.

Whereas the previously mentioned highly developed materials for the production of surface layers lead in the case of oil lubricated applications to excellent results in the technical application, these materials are however completely unsuited for the case in which the use of lubricants is to be avoided, since these materials were indeed specially developed for use in oil lubricated applications.

An important example for an application, which brings considerable disadvantages when using a lubricating liquid, is compressors for the compression of gases. Such compressors are well known in quite diverse embodiments, for example as rotary piston compressors or as reciprocating piston compressors. Reciprocating piston compressors in particular are widespread and have a high technical importance, for example as single-stage compressors when the pressures to be generated are not too high, or as multi-stage compressors, above all for high pressure applications.

In this connection they can be used for the compression of all possible gases, starting with customary environmental air, via pure oxygen, nitrogen, natural gas, noble gases, hydrogen or any other gas or gas mixture. It will be understood that the specific constructional and technical designs of the compressors used vary, depending on the gas which is to be compressed or the pressure range in which the compressed gases are to be made available. All these types of compressors have indeed been known in principle for a long time so that their special technical details do not need to be discussed further at this point.

In principle a reciprocating piston compressor essentially includes a cylinder in which a piston, quite similarly to a reciprocating piston combustion engine, is arranged to be movable to and fro for the compression of a gas. The compression chamber is bounded by the wall of the cylinder, by the piston movably arranged therein and by a cylinder cover. The movement of the piston in the cylinder is generated via a connecting rod connected to a crankshaft, with the crankshaft being driven for example by an engine, for example an electric motor, or by coupling to a combustion engine or to another drive unit.

When the piston is located in the vicinity of the lower dead center position, the gas to be compressed is introduced into the compression space and the gas can be compressed in the reducing volume of the compression chamber to a higher pressure during a subsequent compression stroke, in which the volume of the compression chamber is greatly reduced by a movement of the piston in the direction towards its upper dead center point. In the vicinity of the upper dead center point the gas which stands under the elevated pressure is then directed further via a valve for example into a further compression stage for a further pressure increase or, when the pressure is adequately high, can for example be supplied to a pressure container where it is then available for further use.

In order that a sufficiently high pressure can be produced during the compression stroke of the piston, that is to say during reduction of the volume of the compression chamber by the movement of the piston in the direction towards the upper dead center point, the piston must be sealed as well as possible relative to the cylinder wall in which the piston is executing its movement in the axial direction. For this purpose the piston as a rule has sealing rings formed as piston rings which are bedded in well-known manner in a groove which runs around the piston and stand under a certain radial pre-stress, so that the sealing ring is pressed with a specific force against the running surface of the cylinder wall. A sealing effect is hereby produced so that the gas enclosed to the cylinder can be compressed to a predeterminable pressure. A plurality of such sealing rings are mainly arranged in the form of a packing in one or more peripherally extending grooves at the piston, whereby the sealing action is increased. In this connection, arrangements with pistons without sealing rings are for example known for special applications, if no particularly high pressure is to be produced.

A relatively good seal can admittedly be achieved amongst other things by the previously described measures; however because considerable friction forces arise by the contact between the sealing ring and the running surface of the cylinder wall and/or by the contact between the piston and the running surface of the cylinder wall through the movement of the piston, these friction forces are to be minimized.

This preferably takes place by the use of a lubricant such as for example a lubricating oil, whereby the friction between the parts moved relative to one another can be adequately reduced. Moreover, the seal at the periphery of the piston can be additionally held by the lubricant.

Irrespective of which special application or embodiment of the compressor is used, considerable problems exist with these oil lubricated compressors known from the prior art due to the contamination of the gases to be compressed by the lubricant.

The problems as a result of contamination of the gases by the lubricant can be of different types. For example, if high purity gases are required, for example for laboratory use, or if compressed gases are present which are to be burned in highly complicated components of combustion systems, contamination of the system components by lubricating oil can arise. Thus, for example with vehicles operated with natural gas, components of the injection system such as the injection pump or the injection nozzles can be contaminated. For reasons of environmental protection a contamination of the compressed gases is frequently also highly undesired because lubricant can for example enter into the environment as a finely distributed mist or can be burned at the same time, for example in a vehicle operated with natural gas, whereby noxious combustion products can arise. In addition to contamination, which can lead to blockages or restrictions in fine high pressure lines amongst other things, problems arise not infrequently with enhanced corrosion, for example of components such as metallic high pressure lines, nozzles in the system or pump parts, since the lubricating oils can act aggressively on specific materials, physically, chemically or thermally and so bring about their premature wear.

A further serious problem is the formation of fine lubricant droplets in the compressed gas. Thus, for example, it can transpire that the lubricant distributed in the compressed gas condenses to the above-named droplets which then, on relaxation of the compressed gas, can turn into regular projectiles in a very fast gas flow which, for example, can strike walls or surfaces of attached system components and there cause massive damage as a result of their high kinetic energy.

Compressors for the compression of air for the actuation of brakes in vehicles are an example of known oil lubricated compressors which are very important in practice and which are confronted with essentially all these problems to a greater or lesser degree in operation. In this connection braking systems for rail vehicles, aircraft, motor cars or trucks should be named here in particular, but not exclusively. Such braking systems have indeed been known for a long time and are as a rule operated with compressed air which is made available in a pressure storage container. The pressure in the storage container is in this respect maintained or built up by a suitable compressor which can for example either have its own drive system, for example an electric motor, or can be coupled to the driving engine of the vehicle or driven in another manner.

In the above-named braking systems, in addition to increased wear, the operational security particularly plays a decisive roll, which can be impaired by contamination of the compressed air with lubricant and in the worst case can lead to a failure of the braking system.

It would thus be desirable to use a dry running compressor, that is to say, a compressor which does not require any lubricant between the sealing ring and the running surface of the cylinder wall of the compressor chamber, and/or between the compression piston and the running surface of the cylinder wall of the compression chamber, for a reliable operation of the compressor.

In principle, ceramic alumina coatings have indeed been known, by way of example, for a longer period of time as wear protecting layers or also as electrical insulators. In this connection, in order to reduce the brittleness of the alumina, $TiO_2$ is for example added as an alloying element. In order to increase the toughness of the brittle alumina it is also known on the other hand to add $ZrO_2$, so that through a conversion (from tetragonal to monoclinic) which is coupled with a volume change into a zirconium phase, the toughness relative to pure alumina is increased. The increase of the toughness is thereby related to compressive stresses which are produced in a sprayed-on coating by the conversion into the zirconia phase during cooling following the spraying process.

However, the improved toughness in the materials known from the prior art is always bought at the cost of the layers so that these are unsuitable, in particular in coatings for parts which are in rubbing contact in the dry state, i.e. not lubricated with lubricants or have a restricted working life. These materials are in particular very poorly suited as a coating in a dry running compressor because the reduced hardness rapidly leads to the formation of fretting wear so that the compression chamber is no longer adequately sealed after only a short period of operation. That is to say, a part of the air compressed in the compression chamber can escape through scores which, for example, form in the coating running surface of the compression cylinder as a result of the low hardness of the layer, so that the working pressure which is required can no longer be built up.

Layers whose toughness was not increased by the addition of further alloying components such as zirconia are at least just as unsuitable. Such layers have too little ductility and are thus too brittle, so that the layers rapidly lead to wear under mechanical and thermal loading, for example by the formation of fractures, cracks or scores in the surface.

SUMMARY OF THE INVENTION

An object of the present invention is thus to propose a new material and a process for the formation of a surface layer by means of thermal coating, with which in particular an improvement of the toughness with a simultaneously significantly increased hardness and mechanical strength of the surface layer sprayed with the material is achieved and which additionally have very good tribological characteristics.

A further object of the invention is to propose a compressor, in particular a rotating piston compressor, which has significantly longer operating life and extended service intervals, with a contamination of the medium to be compressed with lubricant being simultaneously avoided.

The invention thus relates to a material based on an oxide ceramic for the manufacture of a surface layer by means of thermal coating including aluminum oxide and zirconium oxide, with the material additionally containing chromium oxide for the simultaneous optimization of the hardness and toughness of the surface layer. Stated more precisely, the invention relates to a material based on an oxide ceramic for the manufacture of a surface layer by means of thermal coating including between 40% and 80% by weight of $Al_2O_3$ and between 10% and 40% by weight of $ZrO_2$, with the material additionally containing up to 35% by weight, preferably between 5% and 35% by weight $Cr_2O_3$ for the simultaneous optimization of the hardness and toughness of the surface layer.

Through the addition of chromium oxide to the composition of aluminum oxide and zirconium oxide, the toughness of a sprayed surface layer is considerably improved in addition to a high hardness and a significantly reduced brittleness. I.e., through the use of the material of the invention for thermal coating, the toughness, the hardness and the mechanical strength are simultaneously optimized. It has, in addition, been shown that a surface layer sprayed with the material of the invention has excellent tribological dry running characteristics. I.e., if a cylinder surface of a cylinder is coated with a material in accordance with the invention, for example, then a piston can be guided in the cylinder even under extreme loadings without an additional liquid lubricant being supplied and without excessive friction losses arising. The working life of the layer is very considerably increased in comparison to known layers, the formation of scores or grooves and the occurrence of cracks and fractures being practically precluded over very long operating periods.

Thus the material of the invention is in particular but not exclusively suitable for the coating of cylinder walls in compression chambers of compressors, in particular of gas compressors such as are used with the brakes of motor vehicles, motor cars or trucks, rail vehicles or airborne craft such as aircraft. In this connection the spectrum of possible fields of use is much broader. The material of the invention is basically suitable for use in all applications in which two workpieces are guided or moved relative to one another in rubbing contact without the use of lubricants, such as for example lubricating oils.

In a preferred embodiment the material additionally contains yttrium oxide. The addition of yttrium oxide permits a partial stabilization of the zirconia phase and permits a moderate or selectable formation of the compressive stress in the sprayed layers.

In another embodiment the material contains titanium oxide in addition to or as an alternative to yttrium oxide, which leads to a further improvement of the toughness through the formation of $Al_xTi_yO_zCr_a$ mixed crystals. In this connection the aluminum oxide is preferably $Al_2O_3$ and/or the titanium oxide is preferably $TiO_2$ and/or the zirconium oxide is preferably $ZrO_2$ and/or the chromium oxide is preferably $Cr_2O_3$ and/or the yttrium oxide is preferably $Y_2O_3$.

In an example which is particularly important in practice, the chromium oxide component amounts to between 5% and 35% by weight and/or the zirconium oxide component to between 10% and 40% by weight and/or the titanium oxide component amounts to 20% by weight and the aluminum oxide component lies between 40% and 80% by weight.

In another important example the chromium oxide component amounts to between 5% and 35% by weight and/or the zirconium oxide component lies between 10% and 40% by weight and/or the titanium oxide component amounts to up to 20% by weight and the rest to 100% by weight is aluminum oxide.

It will be understood that the previously discussed special examples of a material in accordance with the invention are only to be understood by way of example and, amongst other things, that any suitable combination of the special materials indicated can also find an advantageous application and can in particular also contain contaminants which are unimportant for the invention.

The material is preferably made available as a spray powder so that it can be used in a thermal spray powder process. For this purpose the material is processed by melting and/or casting and/or subsequent braking and/or screening into a thermal spray powder.

It will be understood that spray wires for thermal spraying can also, for example, be manufactured from the previous named materials or from any suitable combination of them and that the material can also be made available in any other suitable form for thermal spraying.

If the material is made available as a thermal spray powder, then the particle size of the spray powder lies in a special embodiment between 1 μm and 90 μm, preferably between 5 μm and 45 μm.

The invention furthermore relates to a surface layer based on an oxide ceramic including aluminum oxide and zirconium oxide which is applied by thermal spraying, with the surface layer additionally containing chromium oxide for a simultaneous optimization of the hardness of toughness.

In a further preferred embodiment of a surface layer in accordance with the invention, this can additionally contain yttrium oxide and/or titanium oxide. Aluminum oxide $Al_2O_3$ is thereby preferred and/or the titanium oxide is preferably $TiO_2$ and/or the zirconium oxide is preferably $ZrO_2$ and/or the chromium oxide is preferably $Cr_2O_3$ and/or the yttrium oxide is preferably $Y_2O_3$.

In this connection the chromium oxide compound in the surface layer can amount to between 5% and 35% by weight and/or the zirconium oxide component can amount to between 10% and 40% by weight and/or the titanium oxide component can amount to up to 20% by weight and the aluminum oxide component can lie between 40% and 80% by weight. In another important example the chromium oxide component in the surface layer amounts to between 5% and 35% by weight and/or the zirconium oxide component amounts to between 10% and 40% by weight and/or the titanium oxide component amounts to up to 20% by weight and the rest to 100% by weight is aluminum oxide.

The $Cr_2O_3$ is, in this respect, soluble in alumina and it has been shown that in this respect both the hardness and also the tribological capability of the system, that is to say in particular the friction under dry running conditions, are significantly reduced. Through the addition of titanium oxide $TiO_2$ the sliding characteristics are significantly improved while yttrium oxide $Y_2O_3$ suppresses or prevents the formation of the brittle monoclinic phase of the $ZrO_2$. It will be understood that a surface layer in accordance with the invention can further contain contaminations which are unimportant to the invention in unimportant quantities. The aluminum oxide $Al_2O_3$ is preferably present in a surface layer in accordance with the invention as crystalline alumina α-phase and/or as crystalline alumina γ-phase and/or the $ZrO_2$ is preferably present as the monoclinic phase and/or as the tetragonal phase.

The surface layer has a considerably improved microhardness $HV_{0.3}$ in comparison to the prior art, which preferably lies between 500 $HV_{0.3}$ and 1200 $HV_{0.3}$, especially between 800 $HV_{0.3}$ and 850 $HV_{0.3}$.

In the following table three different embodiments F6350, F6351 and F6352 are shown by way of example for inner coatings in accordance with the invention of the cylinder walls of reciprocating piston compressors and are compared with a known reference coating AMDRY 6350 for comparison. In particular the significantly improved hardness of the surface layers of the invention is apparent, which above all is to be attributed to the addition of chromium oxide. The layers were all sprayed with an atmospheric plasma spray process (APS process) using a Sulzer Metco plasma spray burner of the type F 300.

Layer material and surface characteristics with internal coating with the diameter of 50 to 60 mm, APS method, plasma spray burner SM F 300

| Name | Chemical composition [weight %] | | | | | Micro-hardness [$HV_{0.3}$] | Crystalline main phases |
|---|---|---|---|---|---|---|---|
| | $Al_2O_3$ | $ZrO_2$ | $Cr_2O_3$ | $TiO_2$ | $Y_2O_3$ | | |
| F6350 | 60 | 20 | 20 | — | — | 840 | alumina α, alumina γ, $ZrO_2$ monoclinic, $ZrO_2$ tetragonal |
| F6351 | 55 | 15 | 20 | 10 | — | 845 | alumina α, alumina γ, $ZrO_2$ monoclinic, $ZrO_2$ tetragonal |
| F6352 | 55 | 15 | 15 | 7.5 | 7.5 | 845 | alumina α, alumina γ, $ZrO_2$ tetragonal |
| AMDRY 6350 | 60 | 40 | — | — | — | 700 | alumina α, alumina γ, $ZrO_2$ monoclinic, $ZrO_2$ tetragonal |

Furthermore the invention relates to a coating process for the application of a surface layer such as was characterized in detail above, with the coating process being an atmospheric plasma spray process, a low pressure spray process, a flame spraying process, a wire spraying process or a high speed flame spraying process.

In addition, the present invention can be advantageously used on compressors, in particular oil-free compressors, for the compression of a fluid. Such compressors have a compression piston movably arranged in a compression chamber. One of the surface layers discussed above in detail is applied to a boundary wall of a compressor chamber formed as a running surface. The surface layer is made of a material in accordance with the present invention.

In an embodiment which is particularly important in practice technically, the compressor includes a compressor chamber bounded by a cylinder with a cylinder wall which is provided with a surface layer in accordance with the present invention and in which cylinder a reciprocating piston is arranged to be movable to and fro for the compression of the fluid.

In this connection the compressor does not necessarily have to be a reciprocating piston compressor but rather it can also be another lubricating oil-free compressor such as, for example, a rotary piston compressor or a compressor of a different kind.

BRIEF DESCRIPTION OF THE DRAWINGS

The invention will now be explained in more detail with reference to the drawing.

DESCRIPTION OF THE PREFERRED EMBODIMENTS

Figure 1:
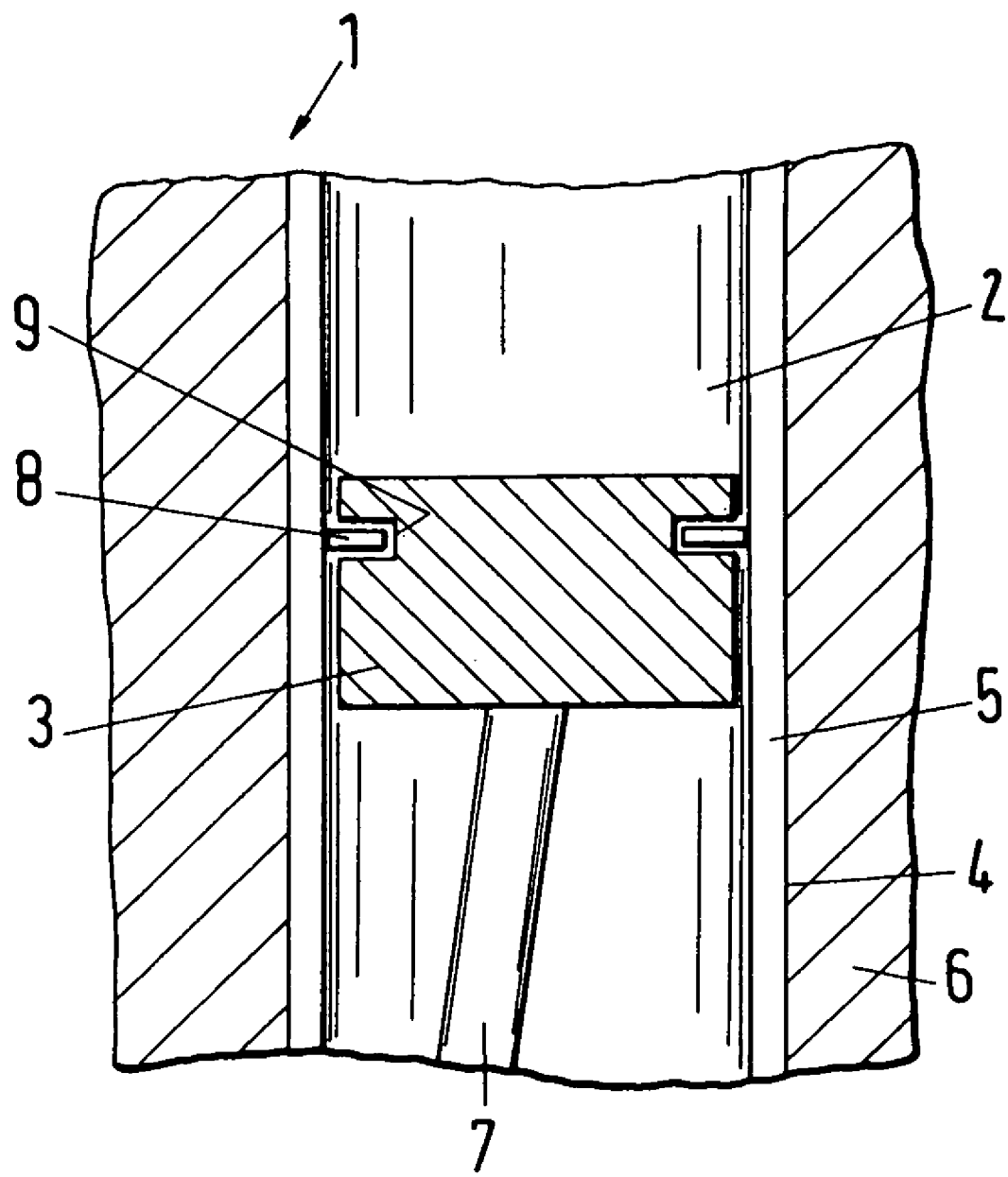
FIG. 1 shows a reciprocating piston compressor with a surface layer in accordance with the invention.

FIG. 1 shows in a schematic illustration a reciprocating piston compressor with a surface layer formed from the material of the invention. An example of a compressor in accordance with the invention, which is particularly important in practice and which is designated in the following as a whole with the reference numeral 1, is schematically shown in section in FIG. 1.

The reciprocating piston compressor 1 includes, in a manner known per se, essentially a cylinder 6 in which a compression chamber 2 is formed in which a piston 3 is arranged for to and fro movement for the compression of a gas in a similar manner to a reciprocating piston combustion engine. The compression chamber 2 is bounded by the cylinder wall 4, by the piston 3 which is movably arranged therein and by a cylinder head which is not shown here. The movement of the piston 3 in the cylinder 6 is generated via a connecting rod 7 which is connected to a likewise non-illustrated crankshaft, with the crankshaft for example being driven by a motor, for example by an electric motor or by coupling it to a combustion engine or to another drive unit.

When the piston 3 is located in the vicinity of the lower dead center position the gas to be compressed is introduced into the compression chamber 2, and the gas in the reducing volume of the compression space 2 is compressed to a higher pressure during a subsequent compression stroke in which the volume of the compression 2 is greatly reduced by movement of the piston 3 in the direction towards its upper dead center position. In the vicinity of the upper dead center point the gas which stands under an elevated pressure is conducted further in known manner via a non-illustrated valve, for example into a further compression stage for further pressure increase, or, when the pressure is adequately high, is for example supplied to a pressure container where it is then available for further use.

In order that an adequately high pressure can be produced during the compression stroke of the piston 3, that is to say during the reduction of the volume of the compression chamber 2 by the movement of the piston in the direction towards the upper dead center point, the piston 3 shown in FIG. 1 has a seal ring 8 formed as a piston ring 8 which is bedded in well-known manner in a peripheral extending groove 9 around the piston 3 and which preferably stands under a certain radial pre-stress so that the sealing ring 8 is pressed with a predeterminable force against the running surface of the cylinder wall 4, whereby a sealing effect is produced so that the gas enclosed in the cylinder 6 can be compressed to a predeterminable pressure. It is preferable, but not essential, for the sealing ring 8 to be built up of a special plastic which is ideally matched to the high demands, in particular to the thermal and tribological loads and also to the existing gas pressure relationships. The sealing ring 8 can also consist of any other material, for example of suitable metals, metal alloys, composite materials or other suitable materials.

In the present example of FIG. 1 only one sealing ring 8 is shown for reasons of simplicity. However, it will be understood that depending on the application a plurality of such rings 8, for example in the form of a packing, can be arranged in one or more peripheral grooves 9 at the piston 3, whereby the sealing action is increased. In this connection, arrangements with a piston 3 without the sealing ring 8 are known for special application, for example, but not only, if the pressure to be produced is not particularly high.

In accordance with the invention the cylinder wall 4 of the compressor 1 is provided with a surface layer 5 which is based on an oxide ceramic and contains at least aluminum oxide, zirconium oxide and additionally chromium oxide for a simultaneous optimization of the hardness and toughness.

The surface layer 5 is in this respect preferably, but not essentially, finish machined after spraying by grinding, honing or other measures so that an ideal matching of the sealing ring 8 to the surface layer 5 is achieved, so that both the sealing action and also the running characteristics, in particular the tribological characteristics, are optimized and the friction forces occurring are minimized.

Through the invention a material based on oxide ceramic is thus provided for the first time for the manufacture of a surface layer by means of thermal spraying with which the hardness and toughness of the surface layer sprayed with it is simultaneously optimized and at the same time it has excellent dry running characteristics. This is achieved by the addition of chromium oxide to a composition of aluminum oxide and zirconium oxide, so that in addition to a high hardness and significantly reduced brittleness the toughness of a spray surface layer is considerably improved.

If, for example, a running surface of a cylinder is coated with a material in accordance with the invention, then a piston can be guided in this cylinder without an additional lubricant, without excessive friction losses arising, even under extreme loadings. The working life of the layer is very significantly increased in comparison to known layers, the formation of grooves or scores and the occurrence of cracks or fractures is, moreover, practically precluded over a very long operating period and, in addition, in conjunction with a compression piston and possible further sealing components such as for example piston rings, an excellent sealing action is achieved relative to the compression chamber in which the gas to be compressed is compressed in the operating state of a compressor.

Thus the material of the invention is in particular suited, but not exclusively, to the coating of cylinder walls in compression chambers of compressors, in particular of gas compressors such as are used with the brakes of motor vehicles, motor cars or trucks, rail vehicles or airborne craft such as aircraft. Rather, the spectrum of the possible fields of use is broader because the material of the invention can basically be successfully used in all applications in which two workpieces are guided or moved relative to one another in rubbing contact without the use of lubricants, for example lubricating oils.

The invention claimed is:

1. A material on the basis of an oxide ceramic for the manufacture of a surface layer by means of a thermal coating process, the material including between 40% and 80% by weight of $Al_2O_3$, between 10% and 40% by weight of $ZrO_2$, up to 35% by weight $Cr_2O_3$ and up to 20% by weight $TiO_2$ for the simultaneous optimization of the hardness and toughness of the surface layer, wherein the material additionally contains yttrium oxide.

2. A material in accordance with claim 1 comprising up to 20% by weight of $Y_2O_3$.

3. A material on the basis of an oxide ceramic for the manufacture of a surface layer by means of a thermal coating process, the material including between 40% and 80% by weight of $Al_2O_3$, between 10% and 40% by weight of $ZrO_2$, up to 35% by weight $Cr_2O_3$ and up to 20% by weight $TiO_2$ for the simultaneous optimization of the hardness and toughness of the surface layer, wherein the material is a thermal spraying powder manufactured by at least one of melting and casting and at least one of subsequent breaking and screening.

4. A material in accordance with claim 3, wherein the particle size of the spray powder lies between 1 μm and 90 μm.

5. A material in accordance with claim 4 wherein the particle size is between 5 μm and 45 μm.

6. A surface layer applied by thermal spraying on the basis of an oxide ceramic including between 40% and 80% by weight $Al_2O_3$, between 10% and 40% by weight $ZrO_2$, up to 35% by weight $Cr_2O_3$ and up to 20% by weight of $TiO_2$ for the simultaneous optimization of the hardness and toughness, wherein the surface layer additionally contains yttrium oxide.

7. A surface layer in accordance with claim 6 comprising up to 20% by weight of $Y_2O_3$.

8. A surface layer applied by thermal spraying on the basis of an oxide ceramic including between 40% and 80% by weight $Al_2O_3$, between 10% and 40% by weight $ZrO_2$, Lip to 35% by weight $Cr_2O_3$ and up to 20% by weight of $TiO_2$ for the simultaneous optimization of the hardness and toughness, wherein $Al_2O_3$ is present in the surface layer as crystalline alumina α phase and/or as crystalline alumina γ phase.

9. A surface layer applied by thermal spraying on the basis of an oxide ceramic including between 40% and 80% by weight $Al_2O_3$, between 10% and 40% by weight $ZrO_2$, up to 35% by weight $Cr_2O_3$ and up to 20% by weight of $TiO_2$ for the simultaneous optimization of the hardness and toughness, wherein $ZrO_2$ is present as at least one of a monoclinic phase and a tetragonal phase.

10. A surface layer applied by thermal spraying on the basis of an oxide ceramic including between 40% and 80% by weight $Al_2O_3$, between 10% and 40% by weight $ZrO_2$, up to 35% by weight $Cr_2O_3$ and up to 20% by weight of $TiO_2$ for the simultaneous optimization of the hardness and toughness, wherein the surface layer has a micro-hardness $HV_{0.3}$ between 500 $HV_{0.3}$ and 1200 $HV_{0.3}$.

11. A surface layer in accordance with claim 10 wherein the surface layer has a micro-hardness between 800 $HV_{0.3}$ and 850 $HV_{0.3}$.

12. A coating process for the application of a surface layer comprising providing an oxide ceramic including between 40% and 80% by weight $Al_2O_3$, between 10% and 40% by weight $ZrO_2$, up to 35% by weight $Cr_2O_3$ and up to 20% by weight of $TiO_2$ and applying the oxide ceramic with one of an atmospheric plasma spraying process, a low pressure plasma spraying process, a flame spraying process and a high speed flame spraying process.

13. A compressor for the compression of a fluid comprising a compression piston movably disposed in a compression chamber and an oxide ceramic surface layer including between 40% and 80% by weight $Al_2O_3$, between 10% and 40% by weight $ZrO_2$, up to 35% by weight $Cr_2O_3$ and up to 20% by weight of $TiO_2$ formed on a boundary wall of the compression chamber.

14. A compressor in accordance with claim 13, wherein the compressor is a reciprocating piston compressor, including a compression chamber bounded by a cylinder having a cylinder wall which is provided with the surface layer and in which cylinder a reciprocating piston is arranged for to and fro movement for the compression of the fluid, wherein a diameter of the cylinder lies between 40 mm and 80 mm.

15. A compressor in accordance with claim 14 wherein the diameter of the cylinder is between 50 mm and 60 mm.

16. A compressor according to claim 13 comprising an oil-free compressor.

17. A surface layer applied by thermal spraying on the basis of an oxide ceramic including between 40% and 80% by weight $Al_2O_3$, between 10% and 40% by weight $ZrO_2$, between 5% and 35% by weight $Cr_2O_3$ and up to 20% by weight of $TiO_2$ for the simultaneous optimization of the hardness and toughness.

* * * * *